Nov. 29, 1960   P. RUTTEN   2,962,151
SILAGE DISTRIBUTOR
Filed Nov. 10, 1958   4 Sheets-Sheet 1
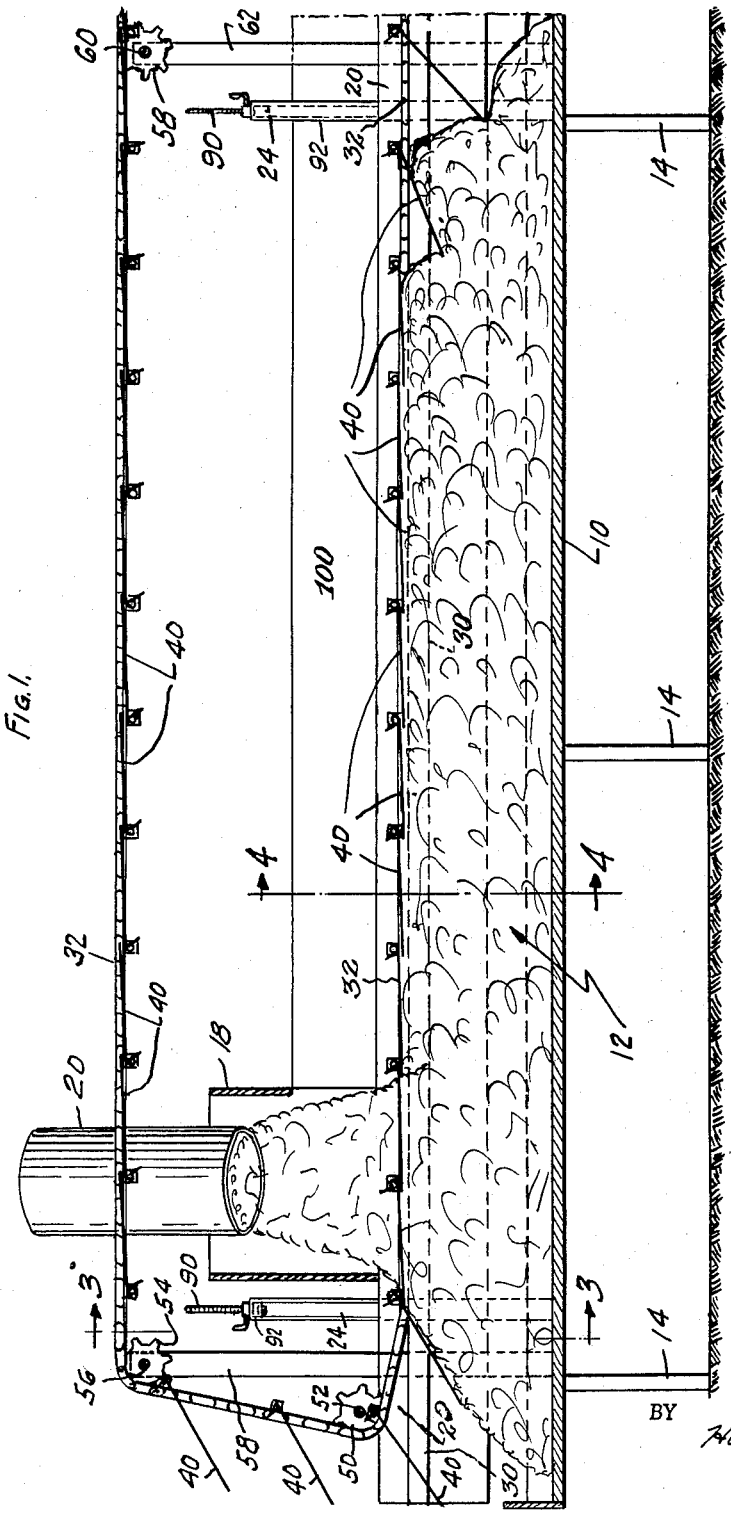
INVENTOR.
PETER RUTTEN
BY
Harry N. Hitzeman
ATTORNEY.

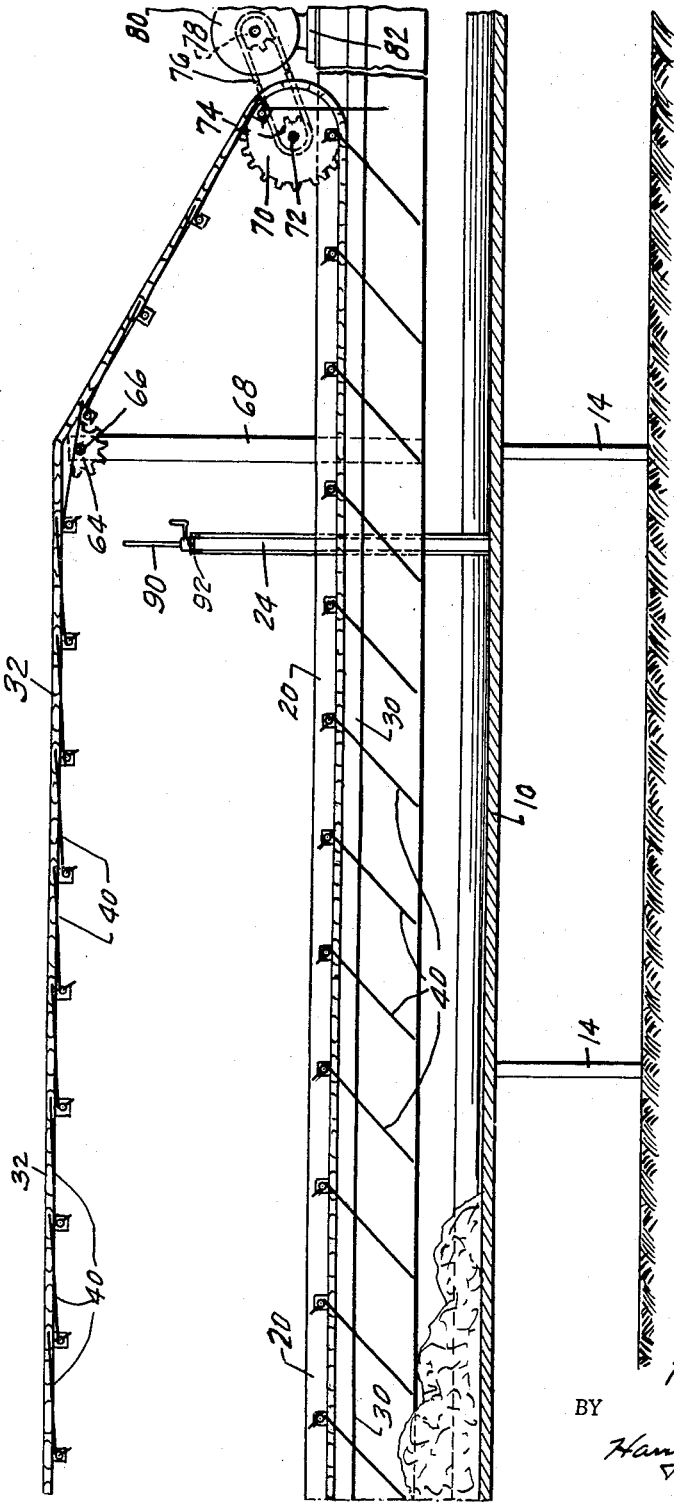

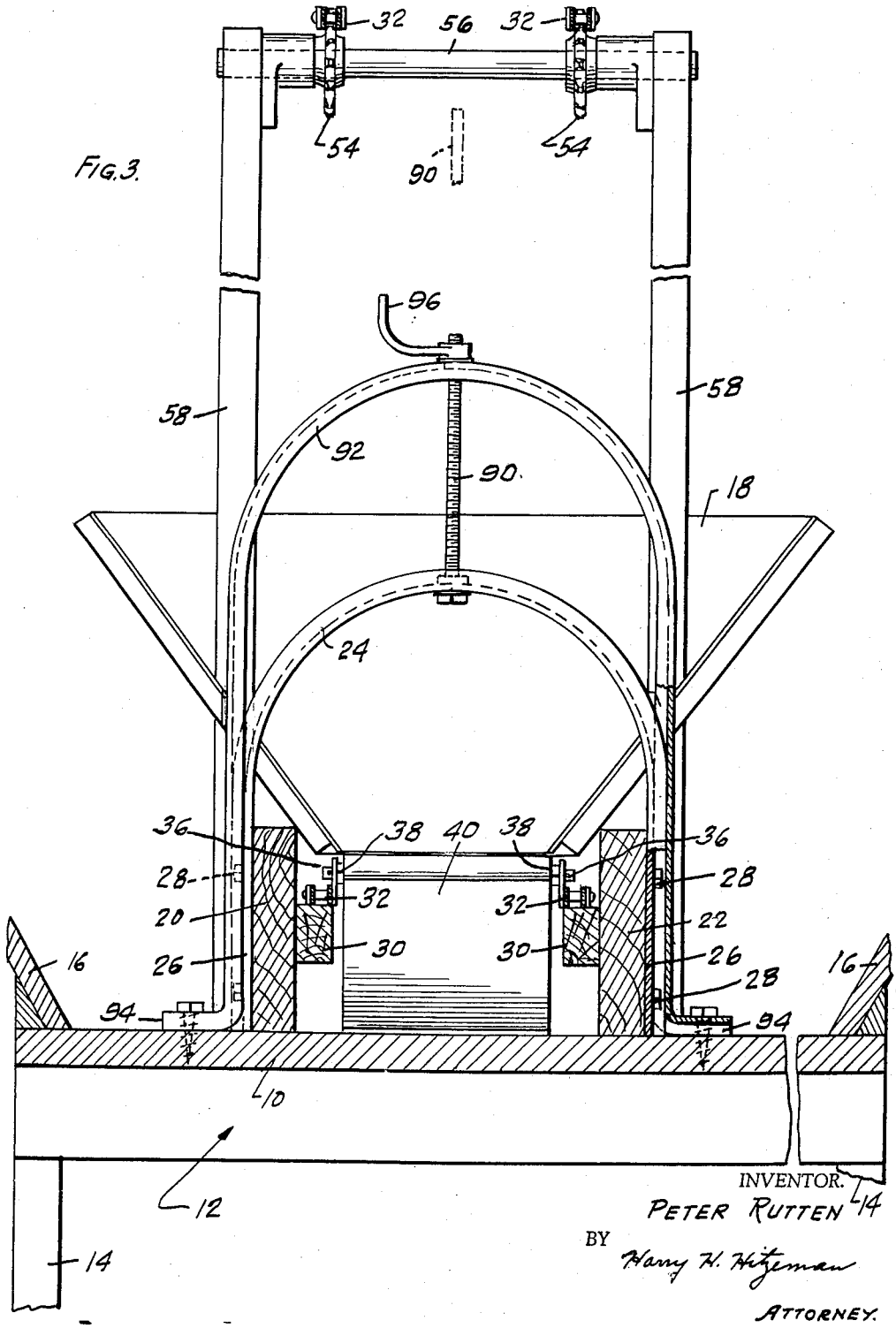

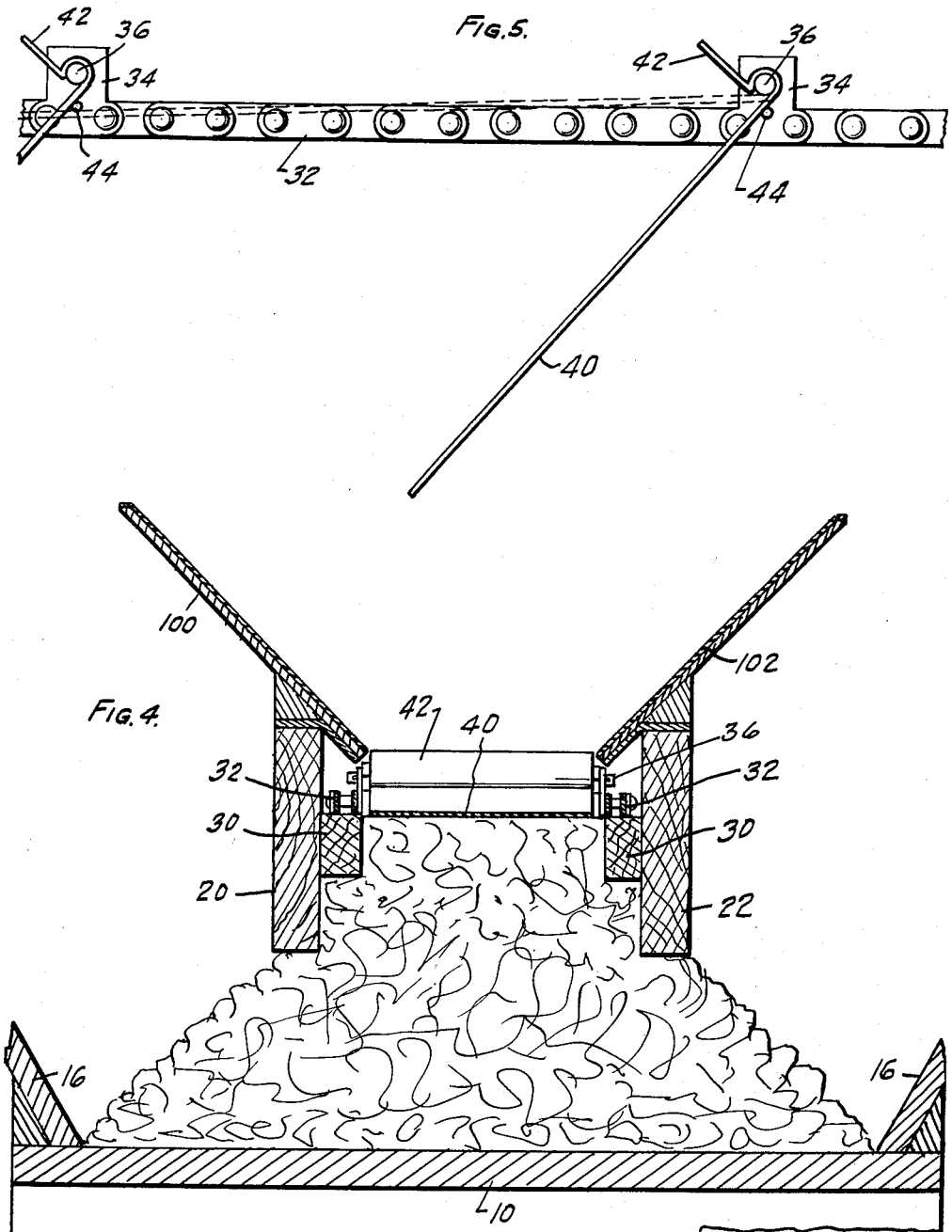

United States Patent Office 2,962,151
Patented Nov. 29, 1960

2,962,151

SILAGE DISTRIBUTOR

Peter Rutten, Plainfield, Ill., assignor to P & D Sales Company, Plainfield, Ill., a partnership Filed Nov. 10, 1958, Ser. No. 772,924

9 Claims. (Cl. 198—155)

My invention relates to improvements in silage distributors and similar devices.

My invention relates more particularly to the silage or other feed distributor generally adapted to be extended in a straight line from a source of feed supply.

Silage or feed distributors of the type to which I refer have been manufactured and sold for some time. One of those at present enjoying a measure of success is called an auger bunk feeder and it generally includes a longitudinally extended feed bunk or trough and a medially disposed auger type feeder which moves silage, grass and other animal foods from a source of supply at one point throughout the length of the feeder, so that cattle or other animals can align themselves on both sides of the same throughout its length and feed.

The principal object of the present invention is to provide an improved type of silage distributor for a feed bunk which has many advantages over those found in the device at present on the market.

A further object of the invention is to provide a distributor of the type described which is so constructed that its action in carrying silage or other feed requires a minimum of power to operate the same.

A further object of the invention is to provide apparatus of the type described which utilizes the principle of employing shovels or pans to carry the silage or other feed throughout the length of the bunk, starting with the same first adjacent the chute or location of deposit of the silage or other feed, and then gradually carrying shovels or pans full of the feed over that already deposited until it reaches the end of the same.

For a more comprehensive understanding of the operation and principles of the aforementioned mechanisms, reference is herein had to the accompanying drawings which illustrate one form of construction of the same.

In the drawings:

Fig. 1 is a longitudinal cross-sectional view of the forward half of a silage distributor and feed bunk of the type described;

Fig. 2 is a continuation thereof which forms the other half or end of the same;

Fig. 3 is a vertical cross-sectional view thereof taken generally on the lines 3—3 of Fig. 1 before the feed carrying mechanism has been raised to a feeding position;

Fig. 4 is a similar cross-sectional view through the feed carrying mechanism and is taken generally on the line 4—4 of Fig. 1; and Fig. 5 is a fragmentary side elevational view of the double endless chains and pans or shovels attached thereto.

In the embodiment of the invention which I have chosen to illustrate and describe the same, the numeral 10 represents the usual bed or floor of a feed bunk 12, the feed bunk being of any desired length within limits, and the floor 10 being generally supported at spaced intervals upon the uprights 14 at the usual height above the ground for comfortable feeding by cattle and other animals. The feed bunks may also have the angularly disposed side walls 16 so that in use cattle may eat from both sides of the feed bunk.

Means for distributing food such as silage, hay, grain or other products throughout the length of the feed bunk may include a dump hopper 18 located adjacent one end of the feed bunk, of sufficient size so that food products may drop into the same through a conduit 20 from either side of the feed bunk, or may of course be thrown in manually. Feed from the hopper 18 will be received upon the floor 10 of the feed bunk between a vertically movable trough formed by a pair of vertically disposed boards or wall members 20 and 22 that extend throughout the length of the feed bunk and are connected at intervals by an arched inverted U-shaped bracket 24, the legs 26 of the same being fastened by suitable bolt members 28 to the outside surfaces of the board members 20 and 22.

Each of the board members 20 and 22 carries a drag strip 30 on its inner face throughout its length, the drag strip 30 being for the purpose of supporting two endless chains 32. The chains 32 have outer links 34 at spaced intervals which have a squared portion extending outwardly therefrom and are drilled to receive the ends of the pan carrying rods 36. The rods 36 have spacer nuts 38 against the facing walls of the same and pivotally mounted pans 40 mounted on the rods between these nuts. The pans 40 are generally rectangular in shape, each having a transversely disposed ledge 42 adjacent the support rod 36. The links 34 also carry abutments or pin members 44 so placed that they limit the dropping movement of the plates 36 to an angle of approximately 50°.

The double chains 32 (see Figs. 1, 2 and 3) are trained about idler sprockets 50 mounted on a cross-shaft 52 that is supported in suitable brackets on the top edges of the bunk walls 20 and 22 adjacent the front end of the same. The chains extend upwardly over suitable idler sprockets 54 mounted on a cross-shaft 56 journaled in suitable bearings on upright posts 58 carried by the side walls 20 and 22.

In feed troughs of somewhat extreme lengths, support sprockets 58 may be mounted on cross-shafts 60 supported by suitable brackets adjacent the upper ends of support posts 62 fastened to the side walls 20 and 22 of the feed bunk. The chains 32 may be trained over suitable guide sprockets 64 mounted on shaft 66 supported in suitable brackets at the upper ends of the upright posts 68 that are fastened to the side walls 20 and 22 of the bunk adjacent the extended end of the same.

A pair of driving sprockets 70 are mounted on a cross-shaft 72 adjacent the extended end of the bunk walls 20 and 22, the shaft 72 being mounted in suitable bearings on the tops of the same. The shaft 72 may be keyed to a sprocket 74 connected by a chain drive shaft 76 to the sprocket 78 of a suitable motor and speed reducer 80 which may be mounted on a platform 82 that straddles the side walls 20 and 22 of the bunk.

With the construction thus far described, when the motor 80 is started there will be a continuous drive of the double chains 32 carrying the plates or shovels 40 from the sprockets 70 over the sprockets 64, 58, 54, under the sprocket 50 and back to the drive sprocket 70. Since the plates or shovels 40 are pivotally mounted on special links in the chains 32, they will drop to an angle of approximately 50° as the chain is moving forward through the bunk formed by the side walls 20 and 22 and supported on the drag strips 30, and as the chains rise above the periphery of the sprocket 70, the pans or plates 40 will drop to a vertical position by gravity and then have their extended edges come to rest on the back edges of adjacent cross-rods and plates as shown in Fig. 2.

When it is desired to distribute silage or other food throughout the length of the feed bunk on the floor 10 of the same, the trough formed by the side walls 20 and 22 is raised by means of a vertically disposed threaded rod 90 connected to the top of the arch of the support bracket 24. It will be noted that in the exemplification of the invention shown, three of the brackets 24 and associated parts are provided, it being understood that the number of the same may be diminished or increased depending upon the length of the feeding trough.

The brackets 24, which are channel-shaped in cross-section, may be confined within larger channel-shaped outer bracket members 92 that are also generally U-shaped and are inverted and fastened by suitable feet members 94 to the floor 10 of the feed bunk. Handle nuts 96 are tapped to receive the screw-threaded support rods 90 and mounted on top of the bracket 92 so that by rotating the same the trough assembly, including the side walls 20 and 22, the brackets 24, the upright supports 58 and the endless chains and their drive motor unit, are all carried up and down in unison.

With this construction, when feed is dropped through the hopper 18 the first amounts will fall directly on to the floor 10 of the feed bunk, and as a pile accumulates the plates or shovels 40, in moving to the right over the same, will be raised about their pivot rods 36 so that eventually feed will fall on top of the plates or shovels 40 and be carried forward sufficiently so that it, too, can be dropped through the trough walls 20 and 22 into the feed bunk 10. In this manner the filling of the entire length of the feed bunk is performed in a remarkably short time and with a comparatively small amount of power, due to the fact that feed is carried only as far as is necessary to drop the same and then the pans or shovels will idle until they again pick up further amounts of feed to drop pans or shovels full at the end of the accumulated longitudinal pile that is being formed.

From the above and foregoing description it can be seen that the amount of power required for operating the feed mechanism is extremely small as compared to auger feeds or other types of feeders which shove or push accumulated feed forward. With these, frozen feed in the trough, twisted or matted knots of food and other obstacles require unusual exertion of power and sometimes cause breakage either in the drive mechanism or in the conveyor itself.

As previously pointed out, the trough side walls 20 and 22 may be raised as high as desired to permit as much feed as required to be deposited in the bunk. Throughout the length of the feed trough I provide continuous slanting side walls 100 and 102 for insuring the delivery of the feed centrally in the trough between the side walls 20 and 22.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. Conveyor means for a stock feed trough comprising an endless conveyor having flat pans pivotally connected thereto in end-to-end relation, said pans adapted to receive material on top of the same and carry it forward over other material in said trough to vacancies therein where by gravity they will tilt to drop the load they are carrying, said conveyor means including two spaced parallel endless chains connected at spaced points by rods and said pans pivotally mounted on said rods and pin members positioned adjacent the ends of said rods to permit said pans to tilt downwardly only to an angle of approximately 50°.

2. Conveyor means for a stock feed trough comprising an endless conveyor consisting of two horizontally disposed parallel spaced endless chains mounted on two pairs of parallel spaced sprockets, rods connected between aligned links, flat rectangular pans pivotally mounted on said rods in end-to-end relation, said pans adapted to receive material on top of the same and carry it forward over other material in said trough to vacancies below said pans where by gravity they will tilt to drop the load they are carrying, said conveyor means having a dispensing hopper over the lower flight of said chains, and means associated with said chains to permit tilting of said pans to approximately 50°.

3. A feed distributor for a feed trough that has a longitudinally disposed horizontal floor comprising inverted U-shaped brackets spaced at intervals on said floor throughout its length, a second set of inverted U-shaped brackets within said first set of brackets, screw means for raising and lowering said inner brackets, a pair of vertically disposed spaced parallel bunk walls carried by said inner brackets, a pair of idler sprockets mounted on said bunk walls above their forward end, a pair of drive sprockets mounted at the back end of said bunk walls, a pair of endless chains trained about said drive sprockets and said idler sprockets, and plate members pivotally connected between said endless chains for forward movement between the side walls of said bunk, said plate members tiltable downwardly only to a 50° angle from the horizontal, a hopper for directing feed on the lower flight of said plate members when they are in a horizontal plane to carry the same forward over feed already deposited in said feed trough.

4. A feed distributor for a feed trough that has a longitudinally disposed horizontal floor comprising inverted U-shaped brackets spaced at intervals on said floor throughout its length, a second set of inverted U-shaped brackets within said first set of brackets, screw means for raising and lowering said inner brackets, a pair of vertically disposed spaced parallel bunk walls carried by said inner brackets, a pair of idler sprockets mounted on said bunk walls above their forward end, a pair of drive sprockets mounted at the back end of said bunk walls, a pair of endless chains trained about said drive sprockets and said idler sprockets, flat plate members pivotally connected between said endless chains for forward movement between the side walls of said bunk and a hopper for directing feed on the lower flight of said plate members to carry the same forward over feed already deposited in said feed trough, said plate members of sufficient length to have their ends overlap when moving forward during their upper flight.

5. A feed distributor for a feed trough that has a longitudinally disposed horizontal floor comprising inverted U-shaped brackets spaced at intervals on said floor throughout its length, a second set of inverted U-shaped brackets within said first set of brackets, screw means for raising and lowering said inner brackets, a pair of vertically disposed spaced parallel bunk walls carried by said inner brackets, a pair of idler sprockets mounted on said bunk walls above their forward end, a pair of drive sprockets mounted at the back end of said bunk walls, a pair of endless chains trained about said drive sprockets and said idler sprockets, plate members pivotally connected between said endless chains for forward horizontal movement between the side walls of said bunk and a hopper for directing feed on the lower flight of said plate members to carry the same forward over feed already deposited in said feed trough, said plate members of sufficient length to have their ends overlap when moving forward during their upper flight, and means permitting said plate members to incline downwardly from horizontal to an angle of more than 45° to permit feed carried thereby to slide off.

6. A feed distributor for a feed trough that has a longitudinally disposed horizontal floor comprising inverted U-shaped brackets spaced at intervals on said floor throughout its length, a second set of inverted U-shaped brackets within said first set of brackets, screw means for raising and lowering said inner brackets, a pair of vertically disposed spaced parallel bunk walls carried by said inner brackets, a drag strip mounted against the inner face of each of said walls, a pair of sprockets mounted above said bunk walls at their forward end, a pair of uprights adjacent thereto, a pair of sprockets mounted on said uprights, a pair of drive sprockets mounted at the back end of said bunk walls, a pair of uprights adjacent thereto, a pair of idler sprockets mounted on said uprights, a pair of endless chains trained about said drive sprockets and said idler sprockets, and plate members connected between said endless chains, said chains having a horizontal forward movement on said drag strips between the side walls of said bunk.

7. A feed distributor for a feed trough that has a longitudinally disposed horizontal floor comprising inverted U-shaped brackets spaced at intervals on said floor throughout its length, a second set of inverted U-shaped brackets within said first set of brackets, screw means for raising and lowering said inner brackets, a pair of vertically disposed spaced parallel bunk walls carried by said inner brackets, a drag strip mounted against the inner face of each of said walls, a pair of sprockets mounted above said bunk walls at their forward end, a pair of uprights adjacent thereto, a pair of sprockets mounted on said uprights, a pair of drive sprockets mounted at the back end of said bunk walls, a pair of uprights adjacent thereto, a pair of idler sprockets mounted on said uprights, a pair of endless chains trained about said drive sprockets and said idler sprockets, and plate members connected between said endless chains, said chains having a horizontal forward movement on said drag strips between the side walls of said bunk, said plates pivotally mounted on aligned links between said chains, said plates having overlapping edges, whereby during the forward movement of the upper flight between said idler sprockets the extended edge of each plate rests on the pivotal edge of each adjacent plate.

8. Conveyor means for a stock feed trough comprising an endless conveyor consisting of two horizontally disposed parallel spaced endless chains mounted on two pairs of parallel spaced sprockets, rods connected between aligned links, flat rectangular pans pivotally mounted on said rods in end-to-end relation, said pans adapted to receive material on top of the same and carry it forward over other material in said trough to vacancies below said pans where by gravity they will tilt to drop the load they are carrying, said conveyor means having a dispensing hopper over the lower flight of said chains and means associated with said chains to permit tilting of said pans to approximately 50°, said pans being of a length to have the ends of the same disposed on adjacent pivots on the upper flight of said chains.

9. A feed distributor for a feed trough that has a longitudinally disposed horizontal floor comprising inverted U-shaped brackets spaced at intervals on said floor throughout its length, a second set of inverted U-shaped brackets within said first set of brackets, screw means for raising and lowering said inner brackets, a pair of vertically disposed spaced parallel bunk walls carried by said inner brackets, a drag strip mounted against the inner face of each of said walls, a pair of sprockets mounted above said bunk walls at their forward end, a pair of uprights adjacent thereto, a pair of sprockets mounted on said uprights, a pair of drive sprockets mounted at the back end of said bunk walls, a pair of uprights adjacent thereto, a pair of idler sprockets mounted on said uprights, a pair of endless chains trained about said drive sprockets and said idler sprockets, and plate members connected between said endless chains, said chains having a horizontal forward movement on said drag strips between the side walls of said bunk, said plates pivotally mounted on aligned links between said chains, said plates having overlapping edges whereby during the forward movement of the upper flight between said idler sprockets the extended edge of each plate rests on the pivotal edge of each adjacent plate, and abutments on said links to limit angular fall of the ends of said plates about their pivots.

References Cited in the file of this patent
UNITED STATES PATENTS

| | | |
|---|---|---|
| 993,221 | Brakey | May 23, 1911 |
| 1,890,762 | Whyte | Dec. 13, 1932 |
| 2,348,056 | Cheely | May 2, 1944 |
| 2,522,449 | Inman | Sept. 12, 1950 |